US008880611B1

United States Patent
Lim et al.

(10) Patent No.: US 8,880,611 B1
(45) Date of Patent: Nov. 4, 2014

(54) METHODS AND APPARATUS FOR DETECTING SPAM MESSAGES IN AN EMAIL SYSTEM

(75) Inventors: Jing Yee Lim, Santa Clara, CA (US); Matthew Daniell Cutts, Mountain View, CA (US); Seth Golub, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 2166 days.

(21) Appl. No.: 10/882,939

(22) Filed: Jun. 30, 2004

(51) Int. Cl.
 *G06F 15/16* (2006.01)
(52) U.S. Cl.
 USPC ............ 709/206; 709/204; 709/205; 709/207
(58) Field of Classification Search
 USPC .................................. 709/204, 205, 206, 207
 See application file for complete search history.

(56) References Cited

U.S. PATENT DOCUMENTS

| | | | |
|---|---|---|---|
| 5,944,787 A * | 8/1999 | Zoken | 709/206 |
| 6,321,267 B1 | 11/2001 | Donaldson | |
| 6,360,010 B1 * | 3/2002 | Hu et al. | 382/180 |
| 6,373,985 B1 * | 4/2002 | Hu et al. | 382/229 |
| 6,421,709 B1 * | 7/2002 | McCormick et al. | 709/206 |
| 6,535,303 B1 * | 3/2003 | Wolf | 358/434 |
| 6,615,242 B1 * | 9/2003 | Riemers | 709/206 |
| 6,625,644 B1 | 9/2003 | Zaras | |
| 6,654,787 B1 * | 11/2003 | Aronson et al. | 709/206 |
| 6,711,624 B1 * | 3/2004 | Narurkar et al. | 719/321 |
| 6,772,196 B1 * | 8/2004 | Kirsch et al. | 709/206 |
| 6,779,021 B1 | 8/2004 | Bates et al. | 709/206 |
| 6,802,012 B1 | 10/2004 | Smithson et al. | 713/200 |
| 6,941,348 B2 | 9/2005 | Petry et al. | 709/206 |
| 6,957,259 B1 | 10/2005 | Malik | 709/225 |
| 6,978,248 B1 | 12/2005 | Walker et al. | 705/10 |
| 7,136,880 B2 * | 11/2006 | Wilkins et al. | 707/203 |
| 7,155,484 B2 | 12/2006 | Malik | |
| 7,155,608 B1 | 12/2006 | Malik et al. | |
| 7,206,814 B2 | 4/2007 | Kirsch | |
| 7,209,954 B1 * | 4/2007 | Rothwell et al. | 709/206 |
| 7,213,260 B2 * | 5/2007 | Judge | 726/3 |
| 7,228,280 B1 | 6/2007 | Scherf et al. | 704/500 |
| 7,272,853 B2 * | 9/2007 | Goodman et al. | 726/13 |
| 7,389,322 B1 * | 6/2008 | Miyazawa | 709/206 |
| 7,409,203 B2 | 8/2008 | Zabawskyj et al. | |
| 7,516,182 B2 | 4/2009 | Goldman | |

(Continued)

FOREIGN PATENT DOCUMENTS

WO WO 01/13576 A2 * 2/2001

OTHER PUBLICATIONS

Dulitz, Amendment, U.S. Appl. No. 10/882,850, Apr. 16, 2008, 15 pgs.

(Continued)

*Primary Examiner* — Ranodhi Serrao
(74) *Attorney, Agent, or Firm* — Morgan, Lewis & Bockius LLP

(57) ABSTRACT

A spam detector accesses a message body of an email, extracts one or more features of a return path from the message body, and uses the extracted features to detect the return path for a user to respond to the email. The return path may include a postal address, and the extracted feature may comprise one or more of a complete or partial street name, city name, state name, country name, street number address, postal code, designations for post office box, and post office box number.

18 Claims, 7 Drawing Sheets

(56) References Cited

U.S. PATENT DOCUMENTS

| | | | |
|---|---|---|---|
| 7,529,802 | B2 | 5/2009 | Nelson et al. |
| 7,548,956 | B1 | 6/2009 | Aoki et al. |
| 2001/0011270 | A1* | 8/2001 | Himmelstein et al. ............ 707/3 |
| 2002/0023135 | A1* | 2/2002 | Shuster ......................... 709/206 |
| 2002/0156763 | A1 | 10/2002 | Marchisio ........................ 707/1 |
| 2002/0174316 | A1 | 11/2002 | Dale et al. .................... 711/170 |
| 2002/0199095 | A1 | 12/2002 | Bandini et al. |
| 2003/0055668 | A1 | 3/2003 | Saran et al. ..................... 705/1 |
| 2003/0088634 | A1 | 5/2003 | Friedman ..................... 709/207 |
| 2003/0101163 | A1 | 5/2003 | Lui et al. |
| 2003/0172292 | A1* | 9/2003 | Judge ........................... 713/200 |
| 2003/0188019 | A1 | 10/2003 | Wesley |
| 2003/0195937 | A1* | 10/2003 | Kircher et al. ............... 709/207 |
| 2003/0217139 | A1 | 11/2003 | Burbeck et al. |
| 2003/0233418 | A1 | 12/2003 | Goldman |
| 2004/0078488 | A1* | 4/2004 | Patrick ......................... 709/245 |
| 2004/0093384 | A1 | 5/2004 | Shipp ........................... 709/206 |
| 2004/0111475 | A1 | 6/2004 | Schultz ......................... 709/206 |
| 2004/0186898 | A1 | 9/2004 | Kimura et al. ............... 709/213 |
| 2004/0221062 | A1 | 11/2004 | Starbuck et al. |
| 2004/0260776 | A1 | 12/2004 | Starbuck et al. ............. 709/206 |
| 2004/0266413 | A1 | 12/2004 | Bronstein ..................... 455/415 |
| 2004/0267886 | A1 | 12/2004 | Malik ........................... 709/200 |
| 2005/0015432 | A1 | 1/2005 | Cohen .......................... 709/201 |
| 2005/0015626 | A1* | 1/2005 | Chasin .......................... 713/201 |
| 2005/0022008 | A1 | 1/2005 | Goodman et al. ............ 713/201 |
| 2005/0033845 | A1 | 2/2005 | Perepa et al. ................. 709/226 |
| 2005/0050150 | A1 | 3/2005 | Dinkin |
| 2005/0076013 | A1* | 4/2005 | Hilbert et al. .................... 707/3 |
| 2005/0076084 | A1 | 4/2005 | Loughmiller et al. ........ 709/206 |
| 2005/0076220 | A1 | 4/2005 | Zhang et al. |
| 2005/0080856 | A1 | 4/2005 | Kirsch |
| 2005/0080857 | A1 | 4/2005 | Kirsch et al. |
| 2005/0091319 | A1 | 4/2005 | Kirsch .......................... 709/206 |
| 2005/0091320 | A1 | 4/2005 | Kirsch et al. ................. 709/206 |
| 2005/0101306 | A1 | 5/2005 | Zabawskyj et al. |
| 2005/0198173 | A1 | 9/2005 | Evans |
| 2005/0240617 | A1 | 10/2005 | Lund et al. |
| 2006/0031319 | A1 | 2/2006 | Nelson et al. |
| 2006/0094405 | A1* | 5/2006 | Dupont ...................... 455/414.1 |
| 2008/0097946 | A1 | 4/2008 | Oliver et al. |

OTHER PUBLICATIONS

Dulitz, Final Office Action, U.S. Appl. No. 10/882,850, Jul. 28, 2008, 14 pgs.
Dulitz, Office Action, U.S. Appl. No. 10/882,850, Jan. 16, 2008, 14 pgs.
Golub, Advisory Action, U.S. Appl. No. 10/883,335, Jun. 4, 2008, 10 pgs.
Golub, Amendment After Decision on Appeal, U.S. Appl. No. 10/882,572, Jan. 31, 2014, 8 pgs.
Golub, Amendment, U.S. Appl. No. 10/882,572, Apr. 9, 2008, 8 pgs.
Golub, Amendment, U.S. Appl. No. 10/883,335, Dec. 4, 2008, 9 pgs.
Golub, Amendment, U.S. Appl. No. 10/883,335, Feb. 11, 2008, 15 pgs.
Golub, Amendment, U.S. Appl. No. 10/883,503, Feb. 28, 2008, 11 pgs.
Golub, Amendment, U.S. Appl. No. 12/538,082, Jan. 3, 2011, 12 pgs.
Golub, Amendment, U.S. Appl. No. 13/294,165, Jun. 26, 2012, 19 pgs.
Golub, Amendment, U.S. Appl. No. 13/294,165, Sep. 28, 2012, 19 pgs.
Golub, Appeal Brief, U.S. Appl. No. 10/882,572, Sep. 16, 2010, 27 pgs.
Golub, Appeal Brief, U.S. Appl. No. 10/883,503, Nov. 2, 2009, 22 pgs.
Golub, Appeal Brief, U.S. Appl. No. 13/294,165, Jan. 31, 2013, 33 pgs.
Golub, Examiner's Answer, U.S. Appl. No. 10/882,572, Dec. 29, 2010, 15 pgs.
Golub, Examiner's Answer, U.S. Appl. No. 10/883,503, Feb. 9, 2010, 27 pgs.
Golub, Examiner's Answer, U.S. Appl. No. 13/294,165, Mar. 6, 2013, 16 pgs.
Golub, Final Office Action, U.S. Appl. No. 10/882,572, Jul. 8, 2009, 15 pgs.
Golub, Final Office Action, U.S. Appl. No. 10/882,572, Jul. 10, 2008, 12 pgs.
Golub, Final Office Action, U.S. Appl. No. 10/882,572, Apr. 16, 2010, 15 pgs.
Golub, Final Office Action, U.S. Appl. No. 10/883,335, Feb. 4, 2009, 11 pgs.
Golub, Final Office Action, U.S. Appl. No. 10/883,335, Mar. 25, 2008, 9 pgs.
Golub, Final Office Action, U.S. Appl. No. 10/883,503, Apr. 8, 2009, 9 pgs.
Golub, Final Office Action, U.S. Appl. No. 10/883,503, Nov. 17, 2008, 8 pgs.
Golub, Final Office Action, U.S. Appl. No. 12/538,082, Mar. 22, 2011, 9 pgs.
Golub, Final Office Action, U.S. Appl. No. 13/294,165, Jul. 30, 2012, 12 pgs.
Golub, Notice of Allowance, U.S. Appl. No. 10/883,335, Apr. 17, 2009, 4 pgs.
Golub, Notice of Allowance, U.S. Appl. No. 12/538,082, Aug. 8, 2011, 5 pgs.
Golub, Office Action, U.S. Appl. No. 10/882,572, Oct. 6, 2009, 14 pgs.
Golub, Office Action, U.S. Appl. No. 10/882,572, Jan. 10, 2008, 9 pgs.
Golub, Office Action, U.S. Appl. No. 10/882,572, Mar. 14, 2014, 12 pgs.
Golub, Office Action, U.S. Appl. No. 10/882,572, Dec. 23, 2008, 15 pgs.
Golub, Office Action, U.S. Appl. No. 10/883,335, Nov. 9, 2007, 11 pgs.
Golub, Office Action, U.S. Appl. No. 10/883,335, Sep. 10, 2008, 10 pgs.
Golub, Office Action, U.S. Appl. No. 10/883,503, Nov. 7, 2007, 12 pgs.
Golub, Office Action, U.S. Appl. No. 12/538,082, Sep. 1, 2010, 12 pgs.
Golub, Office Action, U.S. Appl. No. 13/294,165, Feb. 29, 2012, 10 pgs.
Golub, Patent Board Decision, U.S. Appl. No. 10/882,572, Dec. 3, 2013, 10 pgs.
Golub, Patent Board Decision, U.S. Appl. No. 10/883,503, Feb. 28, 2013, 14 pgs.
Golub, Reply Brief, U.S. Appl. No. 10/882,572, Feb. 25, 2011, 13 pgs.
Golub, Reply Brief, U.S. Appl. No. 10/883,503, Apr. 9, 2010, 17 pgs.
Golub, Reponse to Final office Action, U.S. Appl. No. 10/883,335, Jul. 22, 2008, 14 pgs.
Golub, Response to Final OA, U.S. Appl. No. 10/882,572, Sep. 2, 2009, 10 pgs.
Golub, Response to Final OA, U.S. Appl. No. 10/882,572, Sep. 10, 2008, 8 pgs.
Golub, Response to Final OA, U.S. Appl. No. 10/882,572, Jun. 17, 2010, 13 pgs.
Golub, Response to Final OA, U.S. Appl. No. 10/883,503, Jun. 8, 2009, 9 pgs.
Golub, Response to Final Office Action, U.S. Appl. No. 10/883,335, Apr. 6, 2009, 5 pgs.
Golub, Response to Final Office Action, U.S. Appl. No. 10/883,335, May 27, 2008, 8 pgs.
Golub, Response to Final Office Action, U.S. Appl. No. 12/538,082, Jul. 20, 2011, 6 pgs.
Golub, Response to Office Action, U.S. Appl. No. 10/882,572, Jul. 7, 2014, 13 pgs.
Golub, Response to Office Action, U.S. Appl. No. 10/882,572, Jan. 22, 2010, 10 pgs.
Golub, Response to Office Action, U.S. Appl. No. 10/882,572, Apr. 23, 2009, 10 pgs.
Golub, Response to Office Action, U.S. Appl. No. 10/883,503, Feb. 17, 2009, 10 pgs.

* cited by examiner

METHODS AND APPARATUS FOR DETECTING SPAM MESSAGES IN AN EMAIL SYSTEM

FIELD OF THE INVENTION

The present invention is in the field of network communication including asynchronous messaging systems and pertains more particularly to methods and apparatus for filtering spam messages processed through an email server system.

BACKGROUND OF THE INVENTION

In the field of network communications, more particularly Internet network communications, spam messaging in the form of unsolicited email has become more and more prevalent, targeting both commercial and private consumers. Spamming, generally defined, is the process of sending mass unsolicited messages to network users in the form of e-mail messaging or other text messaging.

There are a variety of known technologies that have rather recently been developed to fight spam messaging, and these are collectively known in the art as spam filtering. Typical prior-art spam filtering techniques rely on the presence of some common and/or unusual traits in spam messages and attempt to classify messages as spam messages according to detection and sometimes analysis of those traits.

Arguably the most prevalent existing spam filtering systems are software applications that use word detection of pre-compiled key words or in some cases phrases that are known to appear in spam messages. These structured text-based filters look for keywords or phrases that appear in email headers, subject lines, and message bodies. There are Bayesian filters, statistical filters, white and blacklist filters, and heuristic filters that perform a number of tests on messages and compare weighted values against a pre-defined weight threshold. Many of these filters can be trained by fine-tuning. For example, manually selecting a message that has escaped filtering and marking that message as spam can add new parameters to the filter criteria so that in the future similar messages will be detected and identified as spam.

Spam filtering is typically performed locally (typically at a users station) by software installed thereon or in many cases as a service at the server-side of a user's connection by server-based software, as is the case with most Web-based e-mail servers. Often there are software components at both sides of a communications link. There are also private and public databases (blacklists) containing identification information of known spam senders. Blacklisting occurs when spam is discovered and can involve listing parameters about the spammer like IP address, company name and address, or URL addresses that are known to be spam related.

As the process of spamming evolves many methods and tools are, at the time of this writing, being developed by spam-sending entities that focus on ways to get around conventional filtering protections. For example, keywords and phrases that might be subject to filtering by text-based parsing and comparison to known words or phrases are masked using hidden characters that are machine readable but do not appear to a human recipient. Keywords are often intentionally misspelled as well as rearranged with respect to phrasing. Spammers also insert characters into message headers and message bodies or into URL strings in an attempt to hide from conventional filtering systems. Filtering for phrases and phrase variations is also time consuming and process intensive and therefore not completely practical for most applications.

Spammers also use well-known spoofing methods to hijack trusted machines, universal resource locators or domain names of trusted sources, and sometimes set up fraudulent (counterfeit) Web sites for interaction, the Web sites emulating those sources. Real contact information is often masked to foil automated location attempts, but must be left intact enough for facilitating a receipt of user monies, or user participation with respect to the goal of the spammer. So one thing that is common to essentially all spam messages is some parameter that directs a recipient's participation, whether it be it a postal address for sending money, a URL for directing recipients to a Web-site, a telephone number to call, or some combination of the above.

Some state-of-the-art spam filters can remove an impressive percentage of Spam mail before the mail is deposited into a user inbox, up to 90% or more in some cases. However spammers, knowing that a good percentage of their mails will be intercepted before reaching a user, typically simply increase the numbers of messages originally sent to insure that the 5 or 10% that make it through remain an adequate amount for their purposes. In a given spam campaign, the actual messages themselves are often altered slightly from message to message so that there are differences among messages in a same batch. In this way spammers increase their percentage figures of mails that ultimately escape the filtering process.

A drawback to commercial spam filtering processes is that often a percentage of non-spam messages are identified as spam. Likewise, many commercial solutions and consumer-based solutions are often manually trained and fine-tuned on a continuing basis by a user or administrator (commercial) in order to achieve adequate filtering percentages. Information from a message that is detected by typical text filtering techniques require that those extracted tuples be pre-known to the system, for example, stored in an internal database for comparison.

Conventional filtering techniques do not eliminate the problems described above altogether. As such, in some cases, those unwanted messages that do get through must be manually sorted and deleted from regular message queues. On the other hand, messages that are not considered spam may be marked as such, which may require manually locating those messages. The time required per user to deal with even a small percentage of spam messages that escape filtering or desired messages that are mistakenly filtered, if multiplied by a large number reflecting the number of users working for a large company for example, becomes a noticeable financial problem for the company.

Therefore, what is needed is a system for filtering spam messages that overcomes some of the above-described problems.

SUMMARY OF THE INVENTION

In an embodiment of the present invention a spam detector is provided, comprising means for accessing a message body of an email, and means for extracting one or more features of a return path from the message body, and using the extracted features to detect the return path for a user to respond to the email.

In one embodiment the return path may include a postal address, and the extracted feature may comprise one or more of complete or partial street name, city name, state name, country name, street number address, postal code, designations for post office box, and post office box number.

Also in an embodiment two or more extracted features may be combined and tested to determine one or more additional features of the postal address. Further, in some embodiments the determined postal address may be arranged into and stored as a postal address in a standardized form.

Also in some embodiments the return path may include a universal resource locator (URL), and the extracted features comprise one or more of a complete or partial portions of the URL.

In still further embodiments two or more extracted features may be combined to determine one or more additional features of the URL. Further, the determined URL may be arranged into and stored as a URL in a standardized form. In some embodiments the return path may be a telephone number, and the extracted features may comprise one or more of a complete or partial portions of a country code, an area code, a telephone number prefix, and a telephone number suffix. Two or more extracted features may be combined to determine one or more additional features of the telephone number. Also the determined telephone number may be arranged into and stored as a telephone number in a standardized form.

In some embodiments the determined return path may be tested against existing information to determine a probability that the email is spam. Also, in the testing, dynamic Internet searching may be used. Still further the spam detector may be integrated with a data repository for storing information dynamically updated by a web-searching facility, wherein, in the testing, information from the dynamically updated data repository may be used to make the determination of probability. The weighting factors also may be applied to the determined return path in a process to create a trust characteristic for the return path.

In another aspect of the invention a method for detecting spam is provided, comprising (a) accessing a message body of an email; (b) extracting features of a return path existing in the email body for use by a recipient of the email to respond to a message in the email; and (c) integrating the extracted features to determine the return path. In some embodiments the return path may be a postal address, and the extracted features may comprise one or more of complete or partial street name, city name, state name, country name, street number address, postal code, designations for post office box, and post office box number.

In some embodiments there may further be an act for combining two or more extracted features and testing to determine one or more additional features of the postal address. The method may further comprise arranging and storing the determined postal address as a postal address in a standardized form. Also, the return path may be a universal resource locator (URL), and the extracted features comprise one or more of a complete or partial portions of the URL. In addition, the method may further comprise combining two or more extracted features to determine one or more additional features of the URL.

In some embodiments there may further be an act for arranging the determined URL to store as a URL in a standardized form. The return path may be a telephone number, and the extracted features may comprise one or more of a complete or partial portions of a country code, a city code, an area code, a telephone number prefix, and a telephone number suffix. In some embodiments the method may further comprise arranging two or more extracted features to determine one or more additional features of the telephone number. Also some embodiments may further comprise arranging the determined telephone number to store as a telephone number in a standardized form. Also some embodiments may further comprise testing the determined return path against existing information to determine a probability that the email is spam. There may be dynamic Internet searching used in the testing.

In still further embodiments the method may further comprise using information from a data repository dynamically updated by Web-searching to make the determination of probability, and may further comprise applying weighting factors to the determined return path to create a trust characteristic for the return path.

In another aspect of the invention a machine-readable medium is provided having stored thereon a set of instructions that cause a machine to perform a method comprising accessing a body portion of an email message; extracting at least one feature of a return path from the body portion of the email message; and using the one or more extracted features to determine the return path.

In some embodiments the return path may be a postal address, and the extracted features may comprise one or more of a complete or partial street name, city name, state name, county name, street number address, postal code, designation for post office box, and post office box number. The method may further comprise combining two or more extracted features and testing to determine one or more additional features of the postal address. Also the method may further comprise arranging and storing the determined postal address as a postal address in a standardized form. The return path may be a universal resource locator (URL), and the extracted features may comprise one or more of a complete or partial portions of the URL. The medium may further comprise combining two or more extracted features to determine one or more additional features of the URL, and may further comprise arranging the determined URL to store as URL in a standardized form.

In some embodiments the return path may be a telephone number, and the extracted features may comprise one or more of a complete or partial portions of a country code, a city code, an area code, a telephone number prefix, and a telephone number suffix. Also in some embodiments the medium may further comprise arranging two or more extracted features to determine one or more additional features of the telephone number. The medium may also further comprise arranging the determined telephone number to store as a telephone number in a standardized form. In still other embodiments the medium may further comprise testing the determined return path against existing information to determine a probability that the email is spam. The method may further comprise using dynamic Internet searching in the testing, using information from a data repository dynamically updated by Web searching to make the determination of probability, or applying weighting factors to the determined return path to create a trust characteristic for the return path.

BRIEF DESCRIPTION OF THE DRAWING FIGURES

DESCRIPTION OF THE PREFERRED EMBODIMENTS

According to one embodiment of the present invention a spam filtering system is provided that leverages web-based knowledge and analysis to rank contact parameters detected within messages according to a weighting criteria which determines whether a message is a spam massage or not a spam message. The methods and apparatus of the present invention are described in enabling detail below in specific examples.

Figure 1:
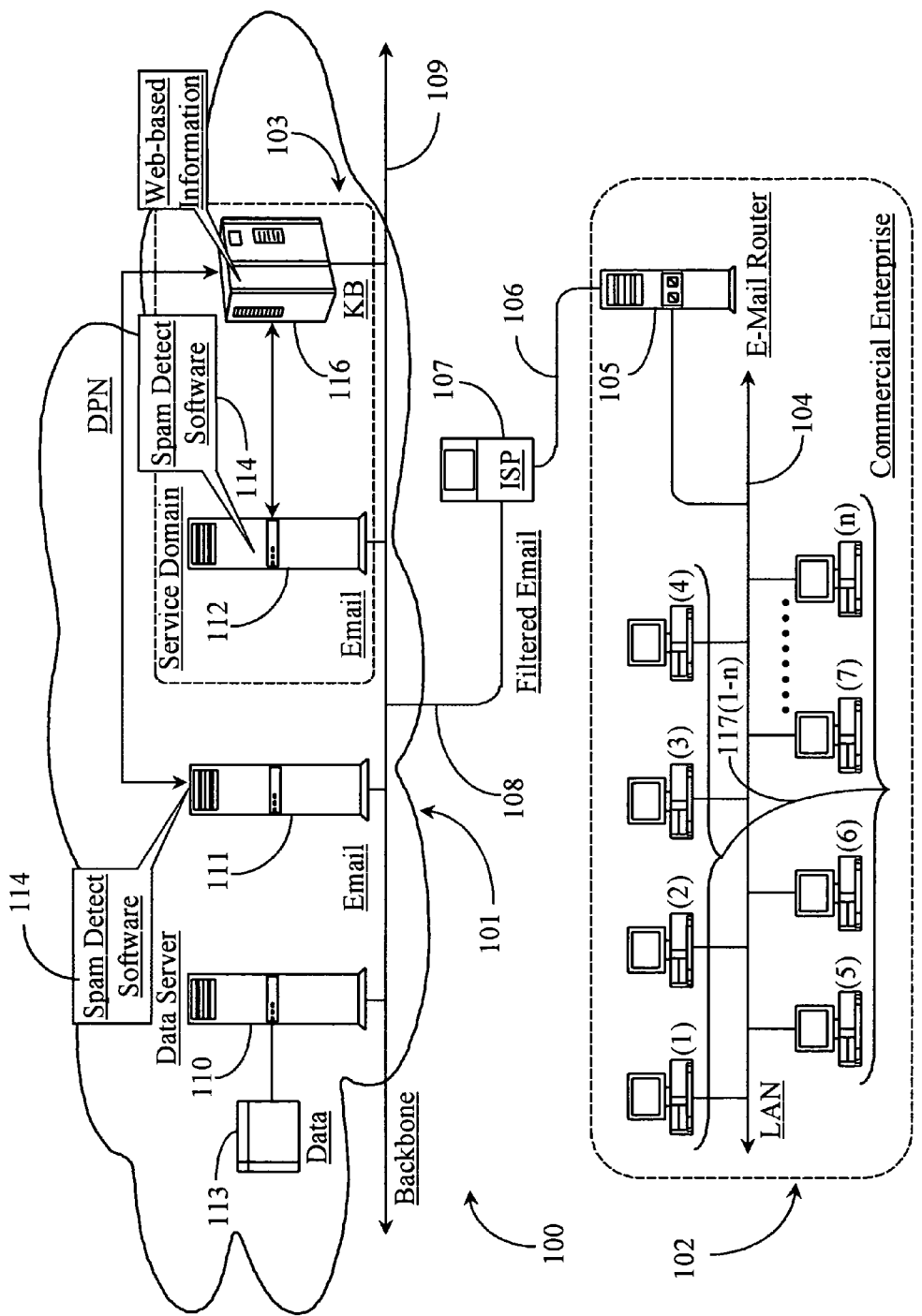
FIG. 1 is an architectural overview of a communications network adapted for filtering spam messages according to an embodiment of the present invention.

FIG. 1 is an architectural overview of a communications network 100 adapted for filtering spam messages according to an embodiment of the present invention. Communications network 100 encompasses a data-packet-network (DPN) 101 and a connected commercial enterprise illustrated herein as commercial enterprise 102. Enterprise 102 can be any type of commercial business like a call-in center, a sales organization, or any other type of business having multiple agents that send and receive email using network 101 as a transport medium.

Network 101 is in one embodiment of the invention a wide-area-network WAN like the well-known Internet network including the World Wide Web (WWW). The Internet network serves as a good example because of the wide public access characteristics of the Internet and because of supporting protocols like transfer control protocol/Internet protocol (TCP/IP) and other Internet protocols supporting email transport. In other embodiments of the invention network 101 may be a corporate Intranet, an Ethernet network or any other sub-network that is adapted for known electronic mail transport protocols like Post Office Protocol (POP), Simple Message Transport Protocol (SMTP), and/or Internet Mail Access Protocol (IMAP), all of which are well known in the art.

DPN 101 will be referred to hereinafter as Internet network 101 in accordance with certain embodiments, but should not be considered to limit the spirit and scope of the present invention. Internet 101 has an Internet backbone 109 extending throughout, which represents the equipment, lines and access points comprising the network as a whole. Therefore there are no geographic limits to the practice of the present invention. Within the domain of Internet 101 there is illustrated a service domain 103. Service domain 103 represents any enterprise that is adapted to host the methods and apparatus of the present invention thus providing services arising therefrom to clients such as to enterprise 102.

An email server system 112 is illustrated within service domain 103 and is connected to backbone 109 for communication. Email server 112 is adapted as a server for storing and forwarding email defined as any electronic messages. In this example, server 112 is hosted and maintained by service domain 103 and provides email services to clients of the hosting enterprise. Server 112 includes a machine-readable medium (also called a computer readable storage medium) storing an instance of spam detection logic 114 (also called spam detection engine or spam detection software) according to an embodiment of the present invention provided thereto and adapted to detect spam messages being forwarded through server 112. Logic 114 may be implemented in some embodiments as software, but in others may be by hardware or firmware, or by a combination of software, hardware or firmware.

A knowledgebase (KB) repository 116 is provided within service domain 103 and is connected to backbone 109 for communication and directly connected to server 112 using a high-speed data connection (double arrow). KB 116 in this example stores and maintains knowledge about contact parameters that may be associated with email messages being processed by server 112. For the purpose of this specification a contact parameter or feature may be defined as any parameter that facilitates recipient participation in the goal of the email message within which the parameter exists. Typical parameters may include one or a combination of postal information, telephone contact information, and Web site information.

The knowledge stored in KB 116 may be Web-based in the sense that it can be accessed from Web-sources and then stored in KB 116 for quick reference. KB 116 is adapted to store information about postal parameters, telephone numbers, and universal resource locators (URLs) that may be associated with one or more email messages being processed by server 112. The information includes data sets that might be directly related to an email contact parameter and sub-sets of data that may be indirectly related to an email contact parameter.

KB 116 logically represents knowledge data that has been accessed, processed, and stored therein. One example of such available data is data that statistically relates in some way to any contact information that might be extracted from an email message that is also available in or listed in the knowledgebase. For example, an extracted URL or portion thereof may be associated to page ranking statistics typically compiled by search engine providers for example. It may be assumed herein that host 103 also has access by ownership or permission to data compiled as a result of logging search engine activity whether it is historic activity, recent activity, or real time activity. In one embodiment, host 103 also has data collection capabilities using data collection technologies. The described functionality in at least an indirect way (process association) may be integrated with spam detection logic 114 to enhance the functionality and performance of the software.

An email server 111 is illustrated within Internet network 101 and connected to backbone 109 at a point outside of service domain 103. Server 111 may be a third-party email server not directly hosted by service domain 103. However, email server 111 is enhanced in this example with an instance of spam detection logic 114 for the purpose of detecting spam using the same methods as used by hosted server 112. In this way, the services of the present invention may be extended to third-party enterprises under a contractual arrangement. Server 111 is illustrated as connected to KB 116 within service domain 103 by way of a high speed data link and therefore has the same capability as hosted server 112. Server 111 also has normal network access via backbone 109 to server 112 and if authorized to KB 116.

It will be apparent to one with skill in the art of email services that the standard email service description of server 111 does not have to be identical to that of server 112 in order to practice an embodiment of the present invention. For example, server 112 may be adapted for IMAP while server 111 may not. Additionally the enterprise that is hosting server 111 may have different email services and features than what is provided by the server in service domain 103. The instance of spam detection logic provided to server 111 may be somewhat altered for service compatibility without departing from the spirit and scope of the present invention.

It will be apparent to one with skill in the art that the services provided by logic 114 may be distributed to a plurality of different third-party servers to enhance the spam detection capabilities of those servers without departing from the spirit and scope of the present invention. Similarly, the enterprise that is hosting server 112 may also host a plurality of additional servers held within the physical boundaries of the enterprise or distributed over backbone 109 at different geographic network locations without departing from the spirit and scope of the invention. The inventor illustrates just one hosted server and one third-party server and deems the illustration sufficient for describing function.

A generic data server 110 is illustrated within network 101 and is connected to backbone 109 for communication at a point outside the physical domain of service domain 103 in this example. Server 110 may be adapted to return data results to any authorized connecting machines upon request. Information returned by server 110 in response to a request from a machine may include HTML embedded information or information transported according to a machine readable protocol like extensible markup language XML, for example. Data server 110 may be any type of third party information server like a Geographic Information System (GIS), for example, a Credit Information System (CIS), a Customer Relations Management (CRM) system or any other public or private information system subject to public access or authorized private access.

Server 110 in this example has a data store 113 connected thereto by a high-speed data link. Data store 113 may be adapted to store and maintain any type of information appropriate to the particular server description. For example, if the system is a GIS then the data held in store 113 might relate to geographic location and mapping data related to defined entities like businesses, landmarks, rivers, parks, or other entities that have physical locations that can be mapped. A system such as this might also provide additional summary information about a physical location or region defined by some boundary (if GIS) like populace information, products of region, rainfall amounts, and so on. It will be recognized by one with skill in the art of information systems that there are a wide variety of such accessible systems available on the Internet, which can be searched using a variety of manual and/or automated methods.

Enterprise 102 in this example may be a client of service domain 103 and therefore subscribes to email services available through server 112 including spam detection services also provided. Enterprise 102 may have a Local-Area-Network (LAN) 104 adapted for Internet network protocols to enable network communication with clients using network 101 as a transport. In this example, LAN 104 provides Internet connectivity to a plurality of workstations illustrated herein as workstations 117 (1-n). It is assumed in this example that each workstation 117 (1-n) is at least adapted for email communication by way of an email client application (not illustrated).

An email routing system 105 is illustrated within enterprise 102 and is adapted as a central routing point for all incoming and outgoing email messages comprising email communication between those workstations 117 (1-n) and external points. Router 105 in this example sorts incoming email and forwards email to appropriate recipients over LAN 104. Outgoing email from LAN connected recipients is forwarded to email server 112. Router 105 is not required in order to practice some embodiments of the present invention. The use of router 105 is merely a convenience for enterprise 102 in that incoming emails may be addressed to, for example, sales@enterprise.com and then be sorted according to subject, content, and so on and distributed to recipients according to any routing strategy.

In another embodiment, each workstation has an email client and account and interacts directly with server 112, the accounts listed in server 112 on behalf of the subscriber stations. In one embodiment, the workstations 117 (1-n) can practice an embodiment of the present invention by accessing mail with a desktop client using POP3 or by accessing mail using a Web-based protocol like IMAP. A difference is that IMAP Web-based services enable access to email server 112 from other network-capable devices in a mobile environment. In both aspects, all spam detection and indication occurs within service domain 103, or in server 111 (third party application).

In practice of the present invention in this example, spam detection logic 114 has access to all email incoming to server 112. Unlike spam filtering of prior-art, detection logic 114 focuses primarily on any portions within the email that might be contact information that a recipient would utilize to participate in the goal of the message. Logic 114 detects and extracts the information from each message according to one or more data structure models. Logic 114 maintains the extracted information in some canonical format, and then uses attributes that can be learned about the information to attempt to determine a trust-oriented ranking or reputation value associated with all or with separate portions of the extracted contact information.

Contact information might be extracted as whole contact features or as separate sub-features belonging to a whole contact feature. A whole feature might be a complete postal address where a recipient can send money. Another example of a whole feature might be a complete telephone number a recipient can call to participate in the goal of the message. Still another example of a whole feature might be a complete URL a user can initiate to participate with a goal of the message. A sub-feature of a whole feature is defined as any atomic units of the whole feature that can stand alone in terms of a unique identity. For example, a sub-feature of a telephone number is the area code portion of that number and, perhaps the first three digits of the number.

Logic 114 uses feature extractors (dedicated logic not illustrated) to extract contact features. An extractor may extract a whole feature and then canonicalize the feature into sub-features of the whole, or there may be extractors provided that are designed to extract sub-features and then assemble the related sub-features into a whole feature represented in canonical form. After extracting and canonicalizing features that might be provided to engage a recipient in cooperation with the goal of the mail message, logic 114 may access KB 116 for each feature or sub-feature to determine if there may be any existing knowledge (feature attributes) therein that map to the feature or sub-feature extracted. In one embodiment, KB 116 is continually updated using data collection technologies used to build search databases. For example, Web-crawlers may periodically look for information on the World Wide Web (WWW) that can be maintained in a search database and made available to clients using Web-search services. A difference here is that the knowledge searched for and compiled may relate in some way to the types of possible contact features that might be found in an email message. Moreover additional information can be collected from server statistics and toolbar logs associated with the use of data collected.

KB 116, in one embodiment for process optimization purposes, may include a sparsely populated hash table (not illustrated) containing hash value pointers that are hashed from known contact features or sub-features. The pointers might point to any information that has been found that relates to that feature in a planned way. Logic 114 may create hash values of sub-features or, in some cases whole features during run time using the same hashing algorithm used to map data to sub-features or features stored in KB 116. Logic 114 then might look for identical values in the hash table of KB 116. A hit related to any feature or sub-feature may cause logic 114 to retrieve the associated raw data and that data may be tagged as attribute information to that feature or sub-feature.

The retrieved information attributed to a feature or sub-feature may be pre-collected value-oriented information that is used to determine a weight value by consultation with a weighting model (not illustrated). The values of all of the sub-features or features found in a particular message may then be manipulated mathematically to classify the message as a spam message, a non-spam message or an unknown message.

Logic 114 can be provided as a standalone spam filtering application that can be used in place of conventional spam filters, or it can be used in conjunction with conventional filtering processes to provide enhanced filtering capabilities. One with skill in the art will recognize that while sender information related to spam messaging may be forged to avoid detection, there typically exists at least one real and complete contact feature in all spam messages in order for the spammer to achieve the goal of the campaign. By focusing on this information and by learning what knowledge is available about the information spam mails may be classified using value ranking.

Figure 2:
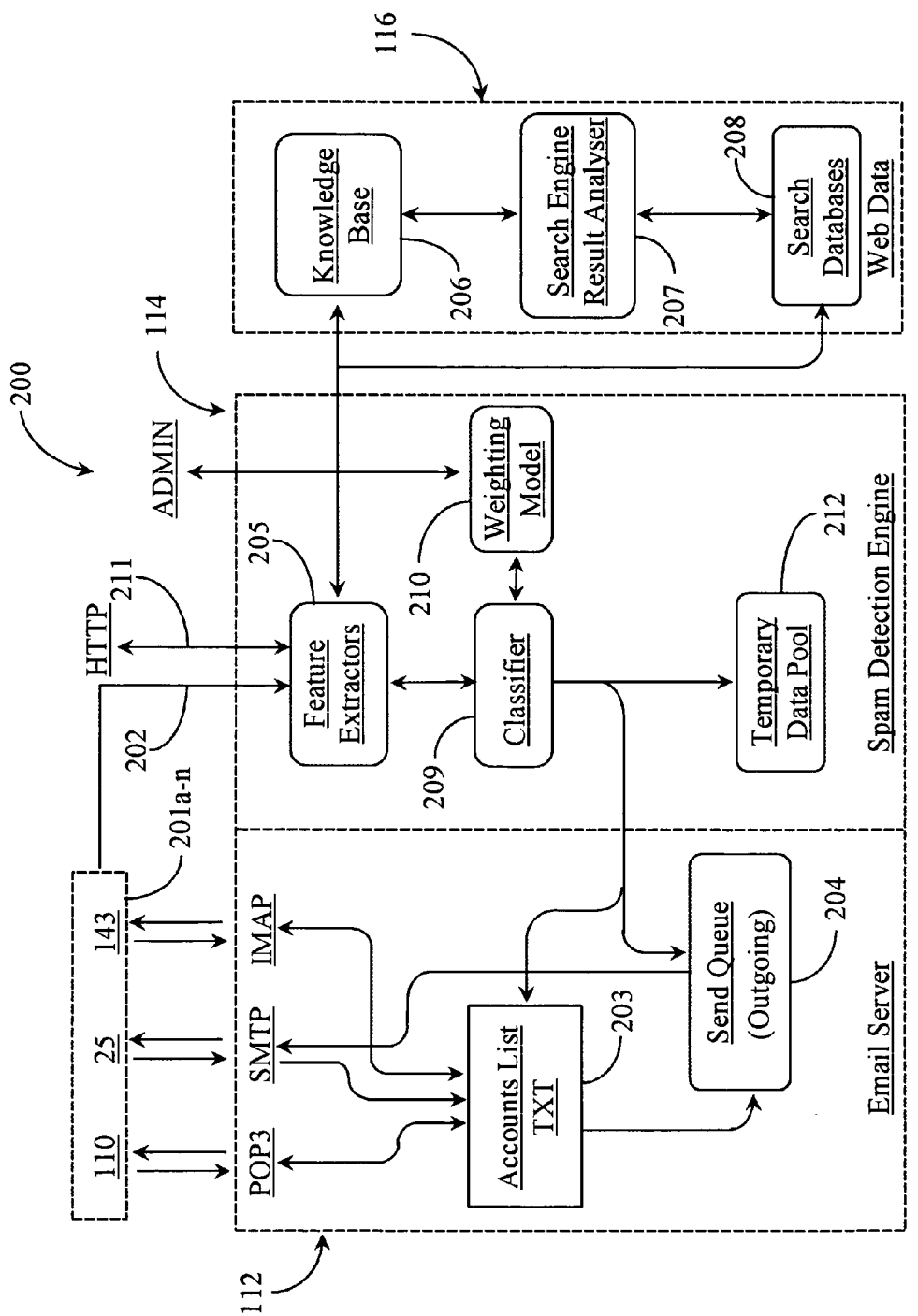
FIG. 2 is a block diagram illustrating a spam detection engine integrated with an email server of FIG. 1 according to an embodiment of the present invention.

FIG. 2 is a block diagram illustrating spam detection logic 114 integrated with email server 112 of FIG. 1 according to an embodiment of the present invention. Email server 112 in this example has ports 201a-n for network communication according to prevalent email protocols. A port 110 is provided for user access under POP3 protocol, a port 25 is provided for outgoing or forwarded mail under SMTP protocol, and a port 143 is provided for user access under IMAP protocol exemplifying a Web-based email service allowing users to access mail from any location using a suitable interface.

Email server 112 in this example has a list of accounts 203 that are the accounts of all of the current subscribers (clients) of the host of server 112. Typically, when an email arrives for a particular account then that mail may be listed in the order it arrived under the appropriate account in accounts list 203, which is a compilation of TXT files. Email attachments, if any, may be associated with the appropriate TXT file and stored separately (not illustrated). Ports 110 and 143 enable users to connect to server 112 and to access their stored messages and attachments. It is noted herein that POP and IMAP may be implemented within a same server. Port 25 in this example is for outgoing mail that is forwarded to some other email server. Outgoing mail may be collected in a queue illustrated herein as a send queue 204.

Email server 112 in alternative embodiments may have more or fewer access ports than are illustrated herein without departing from the spirit and scope of the present invention. The inventor illustrates three ports and deems the illustration sufficient for explanation purposes. Server 112 may also be assumed to provide other services un-related to spam detection that are not specifically illustrated in this example. One such service might be a virus protection application. Email server 112 may be typical in most respects of known servers that perform typical email processing with the exception of provision of and integration of spam detection logic 114 to the email processing components of server 112.

Spam detection logic 114 in this example uses feature extractors 205 to pull features and/or sub-features from each mail message as was described above with respect to FIG. 1. In this example, spam detection logic 114 has direct access to server ports 201a-n via a data line 202 and receives a mirrored copy of each message as it comes into the server. In one embodiment, engine 114 also gets a mirrored copy of each message outgoing and being forwarded to another server. Primarily in certain embodiments detection logic 114 processes email messages from the outside that are classified as incoming messages addressed to clients of the server host.

Alternatively, the methods and apparatus of the present invention may also be applied to outgoing mail, although it is not required in embodiments of the invention. Outgoing messages are typically from trusted sources and therefore not usually suspect. However, it is known that spam campaigns can hijack and utilize existing client machines to distribute a few spam messages each, thereby avoiding the appearance of a bulk mailing campaign. In this case, logic 114 may be used to detect such spam mails.

In another embodiment, feature extractors 205 may process mails that are appended to account list 203 instead of intercepting them from ports over line 204, and if outgoing mail is checked, extractors might access queue 204 processing mails before a send operation.

Extractors 205 may be a compilation of dedicated logic components designed to look for certain contact features and/or contact sub-features. For example, a feature defined as a postal address might be extracted from a message by a feature extractor designed to look for the familiar structure of a postal address. A postal address may be broken up into several parts that have different meanings. A title like a company name might be considered as one sub-feature of a postal address. A street address and a suite number might be considered a separate sub-feature of a postal address. The city and state designation might be yet another sub-feature, and the zip code might be considered the last sub-feature of the postal address.

It will be apparent to one with skill in the art that a postal address may be typed in several different orders and forms in a given message. In a spam message such a technique might be used to avoid automated detection of a structure that would indicate an entire postal address as would be printed on a mail envelope for example. By using feature extractors that focus only on a portion of a whole feature, an entire postal address can be lifted from the message. For example, one postal extractor may look for the structure PO, P.O., PO Box, P.O. Box and Post Office Box followed by a character string representing numbers or the numbers spelled out alphanumerically. A City and State extractor may look for a structure having two or three alphanumeric characters followed or not followed by a period (Ca., Fla., Ca, Fla), or the same spelled out for state and the city spelled out or abbreviated in association with one another. Separate extractors may also be provided to handle City and State respectively without departing from the spirit and scope of the present invention. A zip code extractor might look for the zip code structure of five numeric characters, perhaps including a dash followed by 4 numeric characters or the entire code spelled out.

It is possible to first scan for the entire postal feature or other contact feature using a whole-feature extractor as a first option. If the whole feature is not found then sub-extractors (components of the contact feature extractor) may be applied to look for various missing parts that might make up a postal address. In one embodiment, telephone information and URL information may be extracted the same way. That is, first by looking for an intact whole feature, then by looking for the various parts of the feature. Other extractors may include keyword extractors and email address extractors. An important focus, however, is to extract and therefore learn the real contact information provided in the message.

In one embodiment, feature extractors work simultaneously with one another when processing mail and can extract data independently from one another. In one embodiment a feature extractor can spawn multiple instances of itself for simultaneous processing of more than one email at a given time. If an entire feature is detected intact then it may be canonicalized into a form that also identifies its separable parts or portions. If several parts of the address are found then those parts may take their respective places in the canonicalized form. There are at least two methods for comparing detected sub-features to a KB. In this example KB 116 illustrated with respect to FIG. 1 above may be expanded to show a KB portion illustrated herein as KB 116. Feature extractors 205 may access KB 206 over a data line to check if there is any resident data (attributes) stored therein that map to a feature or sub-feature extracted from a message.

In one embodiment feature extractors have a capability of accessing and receiving attribute data associated only to the sub-feature or feature for which they are responsible. A sub-feature should have enough data to be uniquely identified from other like sub-features. In this way, data about a feature may be accessed even if only a few components of the overall feature might be found. This case assumes that information (raw data) is entered according to a plan for each sub-feature of a whole feature. To illustrate, assume that a sub-feature zip code is found in a message and matched to a KB entry. Raw data about the particular zip code match might include geographic data like population number for the area and whether the area is predominately commercial or predominately residential.

Assume the population for the zip code area is 50,000 entities (people and businesses). Also assume that the area in question is 80% commercial or zoned for industry. Now assume that a weighting rule for any zip code area addresses both population and % of industry for the covered area. The associated rule may state that if the zip code area has 40,000 or more entities then rank it high. If the zip code area has less then 30,000 entities then rank it low. If the number is between 30,000 and 40,000, then inconclusive (no ranking). The same rule structure could apply to the value oriented data of percent of industry. Over 50%, for example might earn a high ranking and less than 30% a low ranking. Between 30% and 50% could be a gray area or judged null (inconclusive). It is not particularly required to have a range-based rule structure and the numbers mentioned above are exemplary only. However in the example given, the raw data attributes returned might cause a high ranking for the sub-feature zip code of a particular postal address.

The type of geographic information cited above is widely available information that can be accessed from a variety of information sources. For example, white pages might be accessed online for a zip code area to return the number of listings (entities). A business information database might be accessed to determine the % of an area zip code that is zoned for business or for residential use. In one embodiment, these types of value-oriented informational attributes for known contact parameters like postal addresses, telephone numbers, and Web sites may be provided.

If a hash of an extracted feature or sub-feature does not get a hit in KB 206, then the hash may be tried again in another database like a search database 208. It may be, for example, that some new data has been found relevant to a particular sub-feature or feature in question. Databases 208 may represent databases that are built using data collection technologies and made accessible to users of search engines for the purpose of returning information about input parameters. In this particular example a search engine and result analyzer 207 is provided that periodically searches databases 208 for new information to be attributed to elements already stored in KB 206. Engine 207 may perform continual updates to KB 206, which overwrite old data if appropriate. For example, new population information could overwrite old population information for a particular element. Likewise determination of a new owner for an address element could overwrite the old owner information and change the duration information of the new owner of the address. An address element that frequently changes ownership and therefore has low time duration might receive a poor ranking if the address element is found in an email being scanned.

All feature extractors that receive hits from KB 206 and databases 208 may save their raw data results and pass them to a classifier component 209. Classifier 209 may retrieve weight assignments for all of the data sets from a weighting model illustrated herein as model 210. All of the correct weights may be given according to the value-oriented result data for each sub-feature or feature. Classifier 209 then may calculate a final ranking or reputation for the entire message. The reputation for example is a measure of trust that the system has mathematically arrived at through a weight calculation algorithm.

Messages may be tagged in this example according to classification as spam messages, non-spam messages, or inconclusive (un-ranked). Weighting model 210 may be strategically crafted according to the kinds of value-oriented data that may be searched for and stored into KB 116 for each type of feature or sub-feature. A URL is very different from a street address. Therefore informational attributes about the domain portion of a URL may be very different than those for a street address. For example, page-ranking statistics are typically maintained on registered URLs. A high-ranking page might be considered more reliable than one that performs poorly. Registration information might also be tapped to glean additional information, such as page owner, or more contact information. Likewise, the types of keywords found in a Web page (used in search engine placement) can also play a role as value-oriented attributes. Much information about registered URLs is readily available through server sites like Whois.com, the Internet Network Information Center (INIC) and the Internet Corporation for Assigned Names and Numbers (ICANN).

Classifier 209 in one embodiment marks email with one of three possible determinations, spam, non-spam, and inconclusive. Spam messages may be deposited into a spam folder or the like while non-spam messages may be filed in the appropriate inboxes. In one embodiment, a special folder may be provided for inconclusive messages. It might be decided by an enterprise that no users should spend any time sorting through designated spam message folders in an attempt to validate manually. It is logical to assume that the time spent on such sorting is a waste for the company. Therefore, the service might be configured to immediately delete the mails designated as spam or to hold them server-side temporarily before deleting them to give any clients a chance to browse them if they suspect that a good mail they were expecting might have inadvertently been rejected as spam. Similarly, if non-conclusive mails are identified they may be stored temporarily as data records for later research.

In one embodiment a temporary data pool 212 may be provided within logic 114 and adapted to store data records that might prove useful for subsequent mail processing. Pool 212 might contain a value calculated from a known spam message wherein the value is a signature for comparison against subsequent mail. For example, if a first spam message of its particular kind is indicated as spam and marked as such, then that message can be formed into a signature pattern by hashing, compression, encryption, or some other method. Future mails that have the same feature can be hashed or encrypted and then compared to the signature of the known spam. Such an optimization process can be interjected anywhere in the process.

Classifier 209 in one embodiment may tag messages in accounts lists 203 and, if outgoing mail is processed, also in send queue 204. One advantage of checking outgoing mail is that it becomes incoming mail to other servers. Therefore if the filtering capability enabled by an embodiment of the present invention is extended contractually to another email server, and it is known that an enhanced server provides a percentage of incoming mail (forwarded) to the other server then that server's instance of detection logic may have to process fewer messages.

In a further embodiment, any inconclusive mails may be tagged as such for the user and any public data accessed during the evaluation process might be summarized and passed on to the user so the user can make a judgment whether to open and respond to the message or not. In one embodiment of the present invention a user is not allowed to adjust the level of spam detection because of the sensitive nature of weighting. However, if a user indicates that a message is spam after viewing the message then the contact features of that message may be reevaluated, based perhaps on the number of users that also have received the same message and have complained or indicated that it was, in fact, spam.

It will be apparent to one with skill in the art that filtering spam based on information that can be found out about real contact information detected may provide improved filtering over prior-art methods. Furthermore, as the information base continues to grow a higher percentage of spam may be caught and eliminated. In one embodiment, contact features that do not get a hit may be looped back to a manual search team that can use conventional searching techniques to compile information that can be converted to value-oriented data and updated to the knowledgebase. The weighting model may be updated appropriately if the attributes are of a new class not before weighted.

In one embodiment, feature extractors 205 may have a capability of spawning automated browsers or "bots" that can access and return data from an external data source using a protocol like hypertext transfer protocol (HTTP). This feature is illustrated in this example by a bi-directional communication arrow 211 emanating from block 205 and labeled HTTP. A feature extractor might launch a bot in the event there were no hits on its feature or sub-feature in KB 206 or in databases 208. The bots could be programmed to search a specific data source or set of sources known to return the type of results required using the contact feature as input.

In the above case it may be that no inconclusive results are tolerated for a mail message, so one or more bots may be sent out to look for specific information related to any of the contact features found that went blank (did not draw a hit). Any information found in this way could be intercepted and analyzed by a human administrator or by an automated program. It would be assumed in this case also that the mail in question would be withheld from download until a determination could be made and updates to KB 206 and to weighting model 210 could be completed.

Figure 3:
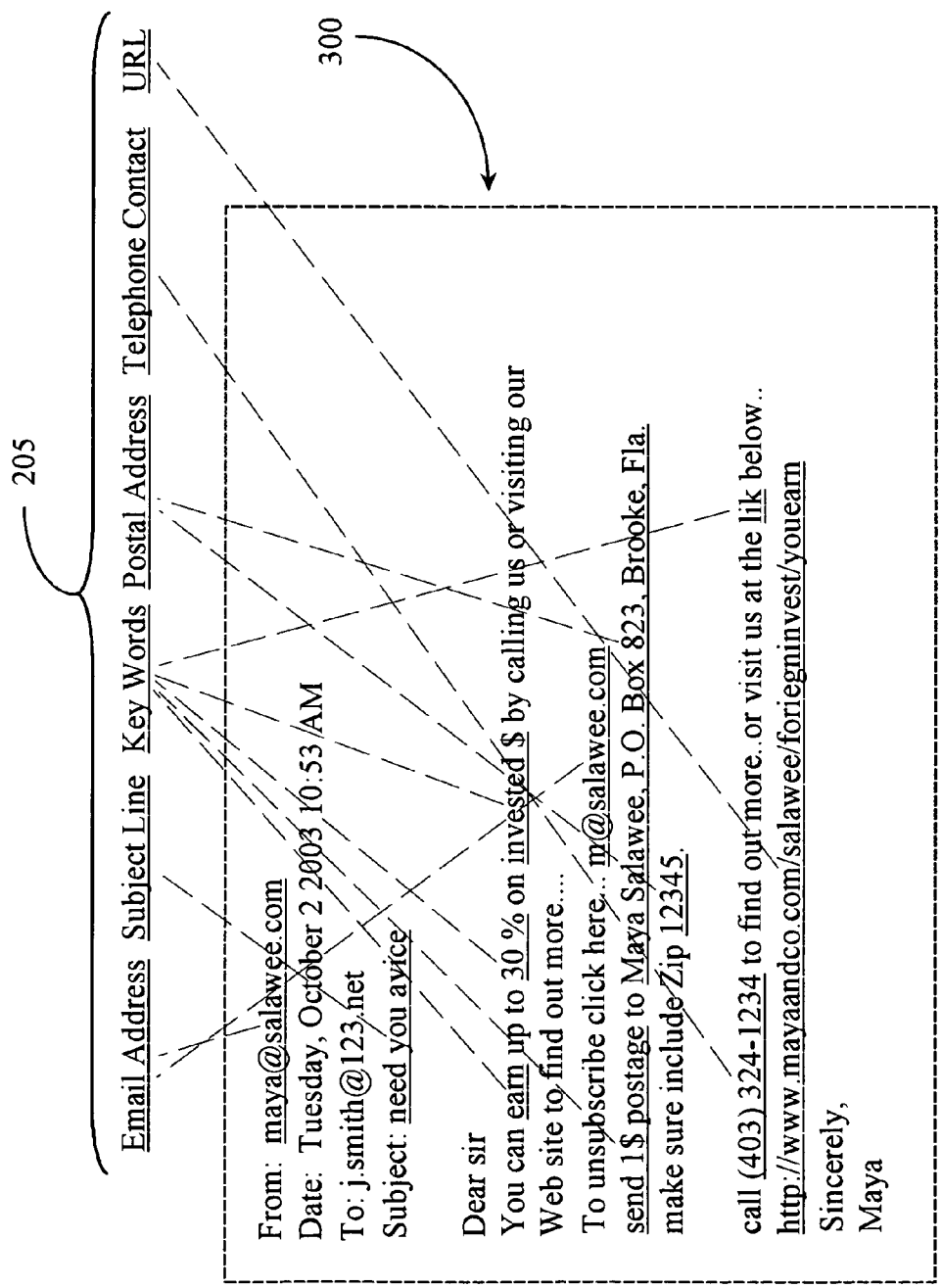
FIG. 3 is a replication of an exemplary email message illustrating contact parameters that are extracted for spam determination purposes according to one embodiment of the present invention.

FIG. 3 is a plan view of an exemplary email message 300 illustrating contact parameters that may be extracted for spam determination purposes according to one embodiment of the present invention. Message 300 in this example represents an exemplary email message that might qualify as a spam message. It is noted herein that there may be data that a user does not see, that can be extracted from header fields of an email, such as sender address, routing source path and so on. However, the header information of a spam email is almost always forged, so analyzing the header data most often yields no useful information.

In the example illustrated by FIG. 3 extractors 205 include an email address extractor, a subject line extractor, a key word extractor, a postal address extractor, a telephone number extractor, and a URL extractor.

Of extractors 205, postal address extractor, telephone contact extractor and the URL extractor are adapted according to an embodiment of the present invention to find whole or sub features that represent information to be used by a recipient to participate in the goal of the message. Other extractors 205 may be present and active without departing from the spirit and scope of the present invention, for example, in a heuristic approach. Extractors, logically represented in this example, are linked by dotted lines to the information types found in message 300 that they may be responsible for detecting.

One with skill in the art will appreciate that some prior-art filters take all of the words in a message body and filter the words for a key word match to words pre-listed in a separate database. Searching for specific characters may be performed in the same manner. Extractors 205, more particularly, the contact feature extractors may focus on matching structure and pattern according to a canonical model of atomic units.

Message 300 in this example has a typical From: field listing the from email address maya@alawee.com. Another version of the from email address is provided as a typical unsubscribe address in the example email. The Email address extractor in this embodiment detects both From addresses and any subsequent email address found in the message body. The email address extractor typically may ignore the To: address if determined that no useful information can be obtained from that address. The From address may prove useless for spam filtering purposes as well, as many spam emails are sent from hijacked machines belonging to unsuspecting and innocent users. The other email address might, however be a link to further spam pop-up advertisements or to a URL prompting further recipient involvement.

Message 300 in this example has a typical subject line, which may or may not be populated with words in other cases. It is noted that the subject line words: "need you avice" in this example is both misspelled and not properly phrased. A misspelled or miss-phrased subject line might indicate a spammer trying to get past a text filter. In this embodiment a keyword filter takes all of the words, and in some cases associated characters found in the message body and filters them for words that might be found in a typical spam message, like the words found in this example: earn, 30, %, invested, $, send, 1$, postage, and lik, which is link misspelled. While typical keyword searches can give an indication of spam likelihood and are currently used in many filter techniques, many of the same words and characters might also be found in legitimate business mail and misspelled words are commonly found in legitimate mails.

In this example the postal address extractor looks for a structure that could be a postal address or a part of a postal address. The postal address extractor can find a whole address feature if it is rendered in the mail in a form recognizable to the model used by the extractor. The whole postal feature in message 300 is Maya Salawe, P.O. Box 823, Brooke, Fla. 12345. Sub-features of the postal address are defined in this example as features that can stand alone and can nevertheless be recognized by structure independently of the rest of the address. Although a sub-feature that might be independently extracted from a postal address might not be uniquely identifiable, say from an identical sub-feature of another postal address, some combination of sub-features of a postal address can render the address uniquely identifiable even though not all of the address is known.

To illustrate the concept stated above, Maya Salawe is a name of an entity of the postal address of message body 300 (typically an individual or company name) that can be used as input to look for information. However, often the title field of a postal address in a spam message is a fictitious name not traceable to a real entity. However, P.O. Box 823 has to be a real entity if the mail is directing recipients to send money. P.O. Box 823 is a sub-feature that can be independently extracted from other sub-features making up a postal address. A problem with attributing any information to P.O. Box 823 is that by itself it can be confused with an identical P.O. Box 823 at some different town and state. Therefore it is desirable that P.O. Box 823 be paired with either zip code 12345 or some other location information from the whole feature like Brooke, Fla. The town Brooke by itself may be confused with other towns of the same name. However Brooke, Fla., or Brooke 12345 can stand-alone and can be used as input to gather information.

It is noted herein that the postal address of message 300 is not rendered exactly like one would expect on a mail envelope, for example. The sub-feature zip code (12345) is separated from the whole feature in message body 300 by the words "make", "sure", and "include". This might be a spammer's attempt to thwart identification attempts of a postal address in the message. Therefore, in accordance with one embodiment, a sub-feature extraction may be enabled in association to the whole feature. Cities, Counties, States, zip codes, P.O. Boxes, and street addresses are sub-features that have association to one another in a model for a postal extractor. In this way if the whole feature cannot first be detected then sub-features may be found and assembled in canonical form to provide the whole feature.

Telephone numbers and URLs can be expressed as whole features or as an assembly of sub features. For example, the telephone number found in this message is considered a whole feature (403) 324-1234. There is enough of the number provided to validate it and to find information about it. Additional sub-features like a country code or a 1- could also be added to a canonical representation of the number. In this case, area code 403 can be used as input to find regional information if "State" is known. The first 3 digits of the number can identify a smaller region within the larger area code region. The last four digits might provide, in some cases, identification of an entity at least cooperating with the entity responsible for the message.

The URL: http://www.mayaandco.com/salawee/foriegin-vest/youearn has multiple sub-features that can be leveraged to provide information. The contact protocol, Top Level Domain (TLD), IP/Domain, and Universal Resource Indicator (URI) can be thought of as sub-features of the whole URL. The specific number of whole contact features in a given email may vary. For example, message 300 contains a postal address, a telephone number to call, and a Web site to visit. However, some spammers may only provide one contact feature. The spammer typically provides at least one contact feature in order to involve the recipient. In one embodiment, other valid contact features from a single contact feature that is found in a message may be determined. For example, a URL provided in a spam message may have to have at least one other valid contact feature (at the site of the URL) if a transaction is to be completed. Therefore, postal addresses, telephone numbers, and URLs can many times be cross-referenced in a KB analogous to KB 206 described with reference to FIG. 2 above.

One with skill in the art will recognize that extracting real and valid contact information from an email message may provide a value-based information that can be used to determine the likelihood of whether the message is in fact a spam message. More detail about the types of information that can be found in exemplary embodiments of the invention and attributed to valid contact features is provided below.

Figure 4:
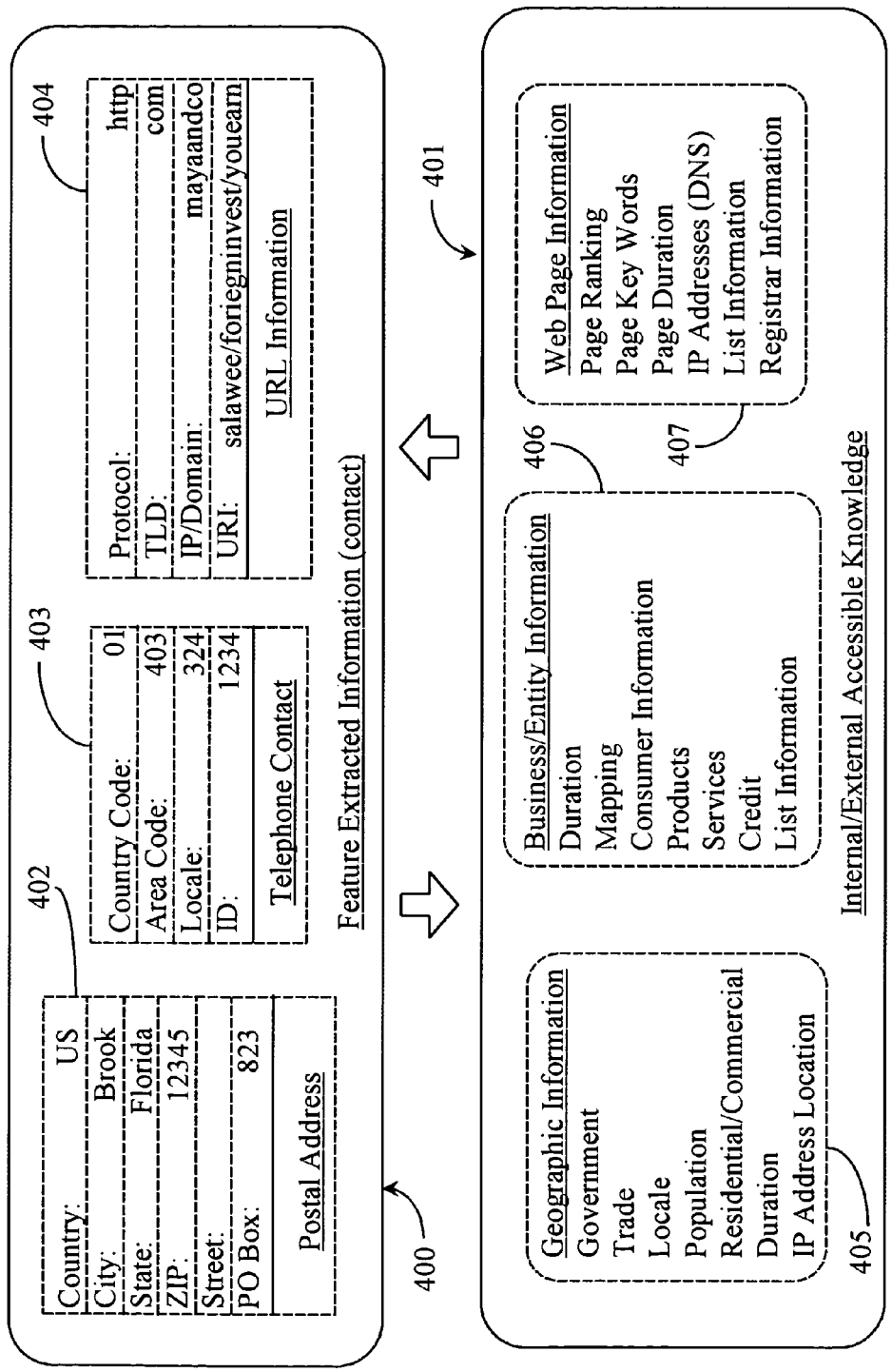
FIG. 4 is a block diagram illustrating canonicalized contact information extracted from the message body of the email of FIG. 3 and types of knowledge that can be accessed using various canonicalized contact parameters as input.

FIG. 4 is a block diagram illustrating canonicalized contact information 400 extracted from the message body of FIG. 3 and types of knowledge 401 that may be accessed using various canonicalized contact parameters as input. Extracted contact information 400 includes in this embodiment a postal address feature 402, a telephone contact feature 403, and a URL feature 404. While a spam message may not include all of these features, at least one of them will typically be provided in order to further the goal of the message.

Beginning with feature 402, the postal information is canonicalized in this example to identify its separate parts and to render the feature more useable as input for searching information from external data sources about the various parts and the whole feature. The sub-features detected in message (300) of FIG. 3 in this example are City: Brook, State: Florida, ZIP 12345, and P.O. Box 823. The Country: field U.S. may be obtained by recognizing the City and State sub-features. A valid contact feature is one that may be utilized successfully by a recipient of the mail. It is important to note herein that the canonical representation of feature 402 can take different forms.

Referring now to knowledge 401, a block 405 is illustrated and labeled Geographic Information. Geographic information 405 may be obtained by searching a Geographic Information System (GIS) database or other known geographic data systems that may be accessible and searchable by a network-connected device. Block 405 is exemplary in illustration of what kinds of information may be classed under the broad subject of geographic. Reading from top to bottom within block 405, in this example there is Government, Trade, Locale, Population, Residential/Commercial (designation for an area), Duration (time owned by one entity), and IP Address Location (geographic network location).

Geographic information may be widely available and may be obtained in one embodiment for the purpose of application to sub-features found in a postal address for example. Geographic information in general can also be applied to telephone contact information and to URL information.

Telephone information 403 in this embodiment includes a country code, an area code, a locale covered by the first 3 digits of the telephone number, and an ID indicated by the last four digits of the telephone number. URL information 404 is shown as canonicalized in this example to reveal the prevailing network protocol, the top-level-domain (TLD), the IP/Domain, and the universal resource indicator (URI) designation.

Information described in block 405 may in some way or another be applied to all three illustrated contact features including sub-features. Exact application of knowledge attributes to contact feature or sub-feature is a matter of design. However, in one embodiment the attribute information found about a contact feature or sub-feature may be worked into a value-based set of data that can later be used in a weighting model to apply a weight to a contact feature or sub-feature.

Another type of information that may be found about contact feature data is business/entity information (block 406). Business or entity information may be any type of information that may be searched out for any business or entity including an individual. Much of this information may be widely available in a variety of network-accessible databases that maintain and provide different types of information. Listed in block 406 in this example are Duration (time of ownership or residence), Mapping (location information), Consumer information, Products, Services, Credit information, and List information (black list data). In other embodiments the listing might be different.

Block 407 is labeled Web page information in this embodiment. This includes various types of information that can be found about any particular URL contact feature or sub-feature. Listed in block 407 in this example are Page Ranking, Page Key Words, Page Duration, IP Addresses, List Information, and Registrar Information.

Although accessible knowledge sources and types are illustrated generally herein and are considered exemplary, it will be appreciated by one with skill in the art that a data collection system capable of accessing various data sources can gather various data related to contact features including sub-features that might be found in a spam message.

Referring now back to FIG. 2, search databases 208 may be populated with data using conventional Web-search technologies known in the art as spider engines that perform a function known in the art as Web crawling to gather data. By manipulating the input parameters of such technologies information may be amassed about contact information in general, including countries states, cities, zip codes, area codes, domains, IP addresses, and so on. Information may exist already on these and may be accessed and processed to form value-based data attributes that can be attributed to particular contact parameters listed in KB 206.

Referring now back to FIG. 3, to illustrate an example of how general information might be leveraged to provide value-based attributes for real contact parameters found in spam in accordance with one embodiment of the invention, consider that an existing database has most of the known current postal addresses of businesses and individuals in the state of Florida, for example. All of those known addresses may be collected, maintained in a database, and then used as input to gather other data that might relate to the parameters. Country, City, State, and Zip all lend to immediate geographic categorization in terms of known regions.

Once regions are known, population information may be collected from a variety of sources like government-maintained data stores, university-maintained data stores, and so on. Population of zip code areas may be used as a value attributed to that particular sub-feature of a whole feature. A region may be determined according to what percentage is residential and what percentage is commercial. At least two value-based attributes, population, and commercial residential breakdown can now be applied to zip codes in Florida.

A weighting rule for a zip code in general spam detection might determine that zip code areas with a population of over 70,000, and a commercial make-up of at least 40% receive a 1, meaning trusted. Zip code areas that do not meet these criteria may receive a 0, meaning not trusted. Zip code trust metrics alone may not be much help in spam determination without any other knowledge about contact information available. So other contact parameters of a typical contact feature, in this particular case postal address, are assigned other types of information attributes that can be similarly used in weighting of that parameter.

If parameters of a postal address are known, often telephone numbers and URLs may be found and added to contact feature information maintained in a KB. Likewise, telephone and postal information may often be found related to URL information. In this way if only one complete contact feature is detected in a particular mail message body then it can possibly be cross-referenced to other related contact features and weighted appropriately in an embodiment of the present invention.

Web Page information 407 may be leveraged to provide page ranking for a particular URL, a list of key words that might be used to gain search engine placement, page duration (how long in existence on server) and so on. In some cases URLs may be found on known black lists that indicate spam. Domain name registration information may include other contact and identity information (URL owner) and may be publicly searchable. A URL may be weighted according to page ranking, such as High=1, Low=0. Page key-word sets may be scrutinized and scored according to content. If a URL is found in a mail that draws a hit in the KB and the key words associated with the page are negative then a 0 weight might result for that URL. It is important to note that weighting might be very simple for sub-features and whole features. For example, a combination of weights for each sub-feature of a whole feature might determine the weight of the whole feature. If new attributes are discovered about a general sub-feature of a whole feature then they may be incorporated into the weighting model described with reference to FIG. 2 above. Likewise weighting might be more complex, like a range-based scoring system. There are many possibilities.

DNS server data may be accessed to get a list of IP addresses associated with any domain. Some IP addresses may also be found on black lists of known spam entities. If contact features can be attributed to particular valid entities like registered businesses, consumer information like number of complaints registered, types of products and services engaged in, business health in terms of credit information and so on can be determined. Business or entities associated with spam might also be located on some blacklist.

In a given knowledgebase, optimization methods may be used to exclude contact information that will most likely not be associated with spam. For example, contact information collected, related to, and validated for well-known and trusted organizations known to be opposed to spam may be excluded from the knowledgebase. A goal may be to build a knowledgebase that is robust enough to contain contact parameters that will turn up as contact information in spam messages. By using data-hash values taken from parameters found in mail and attempting to match those values in a hash table, searching for applicable data in a KB may be optimized. In the KB a hash value match indicates data stored and related to the hash value. The related data might also contain pointers to still more data, like related contact features that may or may not be included in the email message being processed at the instant.

Figure 5:
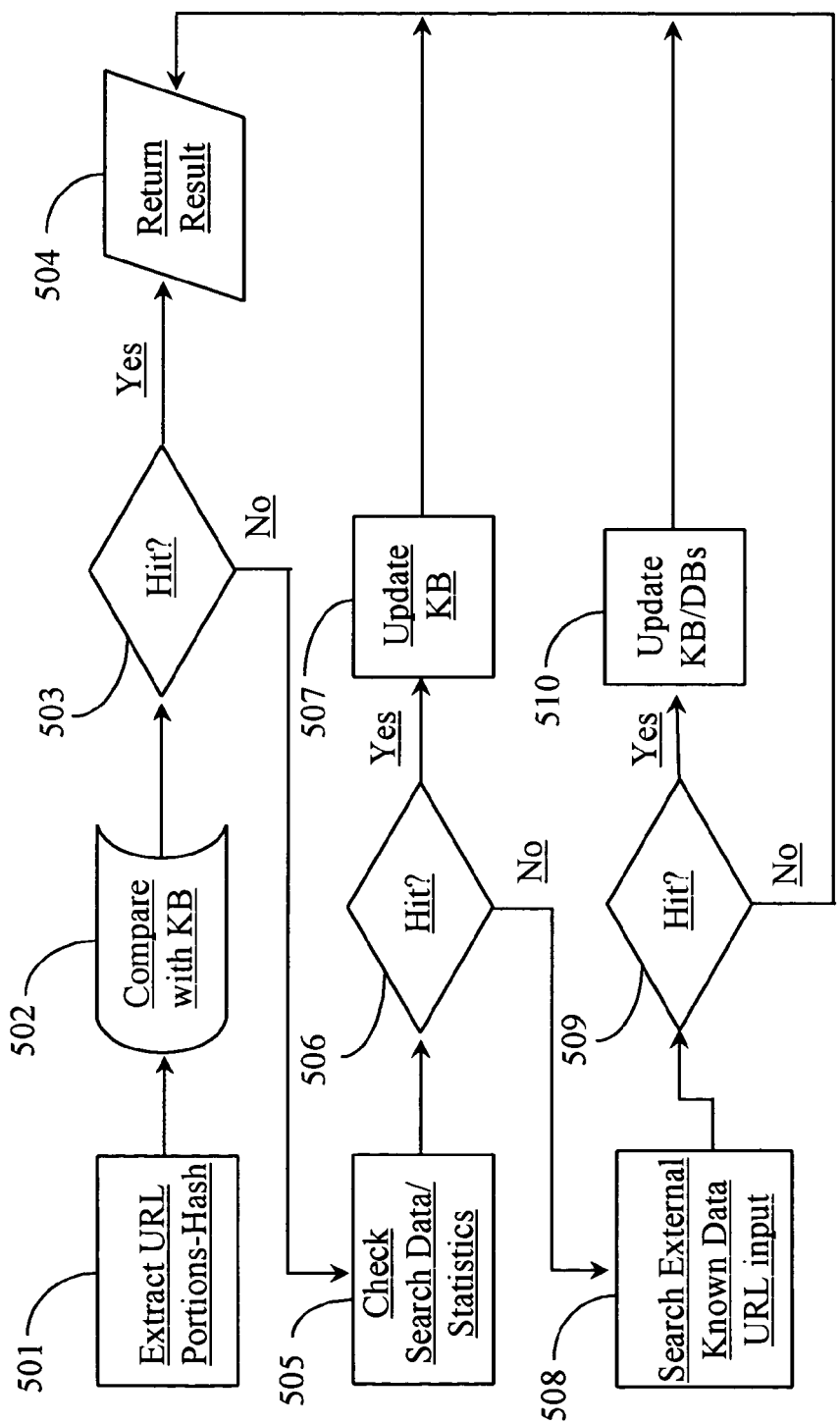
FIG. 5 is a process flow diagram illustrating steps for extracting a URL from a message and using all or a portion of the URL as input for one or more search actions to return one or more raw data results used in spam determination.

FIG. 5 is a process flow diagram illustrating a method for extracting a URL from a message and using all or a portion thereof as input for one or more search actions to return one or more raw data results used in spam determination, in accordance with one embodiment of the invention. The process of this example describes URL extraction from an email message body and includes determining URL strings embedded in an HTML embedded link. At act 501, a feature extractor analogous to one of extractors 205 described with reference to FIG. 2 above extracts URL portions or sub-features from the message body of an email and, in one embodiment creates hash values from the found features. This example assumes that at least one URL string or HTML link having a URL path associated therewith is present in the email message body. In the event more than one URL string and/or link is present, then the feature extractor may detect the sub-features of each URL by design and associate those sub-features correctly with each whole URL feature.

In one embodiment, the URL sub-features may not be hashed but simply compiled to form a canonical representation of the entire URL string. In another embodiment, only certain portions of the canonical form of a URL may be hashed and used for knowledgebase comparison. It is important to note that the URL extracted is represented in at least one canonical form including hash values that is complete enough to derive a URL match from a knowledgebase analogous to KB 206 described with reference to FIG. 2.

At act 502, the hashed values are checked against a hash table provided in the knowledgebase, the hash values stored in the hash table being pointers to raw data stored in the knowledgebase. At act 503 hit determinations are made. A hit is determined in this case if a hash value created from the URL feature matches one stored in the hash table. If one URL has more than one hashed sub-feature and one of those receives a hit at act 503, then it is highly likely that any other hashes of the same URL will also receive a hit. The most important portions of a URL in this example are the TLD (.com, .biz, .gov, .edu,) and the IP/Domain portion, which reveals an entity that might be the spammer, an entity cooperating with the spammer, or an entity duped by the spammer. For example, a spammer in some cases may still use a URL having a domain of a trusted source. In this case, the URI portion of the URL becomes important to distinguish the spamming entity from the trusted source. In this sense a weight may be applied only to a whole URL after first considering various sub-features.

In one embodiment, a URL feature extractor may be adapted to look for an entire URL feature first in an e-mail and then to look for sub-features of the URL. The capability of looking for sub-features or canonical portions is very important with respect to obtaining a hit in a knowledgebase. Many spammers try to disguise a URL string by inserting various HTML comments into the string. However, if sufficient sub-features are singularly detected but not the whole string, then a hit for one of the sub-features can point to raw data, which may also points to other related sub-features of the URL that were not detected in the email.

For example, if a hit on a particular domain is made at step 503, then raw data about the domain might include pointers to other URL information stored in the KB that is related to the same domain. In this case information found out about the URL domain may include additional contact information not provided with the original email. This may be accomplished by storing contract information in contact matrices wherein all of the sub-features have some association or relation. If a matched domain parameter is used by a trusted source operating in the U.S. for example, but a TLD detected in the mail and associated with the domain indicates that the URL is not of U.S. origin, then the combination might be appropriately weighted as a non-trusted combination.

A contract matrix in this example lists contact sub-features, which may assemble into a contact feature and may provide the missing parts if enough of the contact feature can be detected. Furthermore, a contact matrix may include additional pointers to other related contact features that were not included in the spam message. For example, a contact matrix for a URL might also include a pointer to a related telephone number lifted from the actual URL page. The minimum that may be required to access and fire a contact matrix is to be able to detect enough of a contact feature to uniquely identify it and isolate it from other possible contact features. For a URL, the protocol http: and the TLD .com would likely not be enough to uniquely identify the contact feature. In one embodiment, at least the domain and at least a portion of the URI string should be detected in a mail to cause a contact matrix to fire.

In one embodiment of the invention, feature extractors may process a message body simultaneously. For example URL extraction may run parallel with extraction of telephone contact and postal contact extraction. Key word and character extraction can also be included. For example, extracting the key words "mail" and "to" might help an integrated postal extractor to find the beginning of a postal address.

If there is a hit (matched hash value) at act 503, then the associated raw data the value pointed to is returned to the extractor by the KB at act 504. If there is no hit at act 503 for a particular hash value, then optionally at act 505 the canonical feature the hash was taken from may be used as text input to check search database data and associated statistics for any data that might be stored therein. A hit determination at step 506 may cause an update of data to the knowledgebase at act 507 and the process resolves back to act 504 for returning the correct raw data to the extractor. For example, a particular domain name that does not receive a hit through the hash table check but does receive a hit in a search database may cause a search engine component analogous to component 207 described with reference to FIG. 2 to analyze the raw data associated with the hit and update the knowledge base with the appropriate raw data found. In one embodiment, the raw data taken from the search database should agree with content and form of the raw data classes accepted (weighting rules) for the domain feature or no raw data may be returned until a manual update to the weighting model is performed to create a new weighting rule to legitimize the new raw data considered.

If there is no hit at act 506, an option is to launch an external data search at act 508 using the canonical form of the feature as input for searching from one or more pre-defined data sources. These external sources may be robotically searched by the extractors themselves and may request a specific format for returned data. External data sources may be selected logically for a search based on the extractor type involved. For example, a URL extractor might be used to search DNS data for IP address information, or a registrar database for information included with the registration of a particular domain name. At act 509 if there is a hit in an external data source, then a human worker may intercept and analyze the data returned and make manual updates to the KB and search databases in act 510. At act 509 if there is no hit in an external database then a default result of "no data" or "null" may be returned and no weighting may be performed associated with the feature or sub-feature used in the search.

The process identified above in accordance with one embodiment include acts 501, 502, 503, and 504. In the event of no hit at act 503, a simple null value might be returned. There may be a specific rule that must be fired in order to launch the optional portions of the process. For example, if a hash value for a particular sub-feature does not receive a hit but sufficient other hits are registered related to the same contact class, then additional data searching might be avoided. If only one contact class is detected and none of the hash values receive a hit, then by default the optional processes may be launched in an attempt to learn something about the contact information detected. It is noted herein that an incoming message can be withheld from a recipient for a period of time until some determination can be made.

Figure 6:
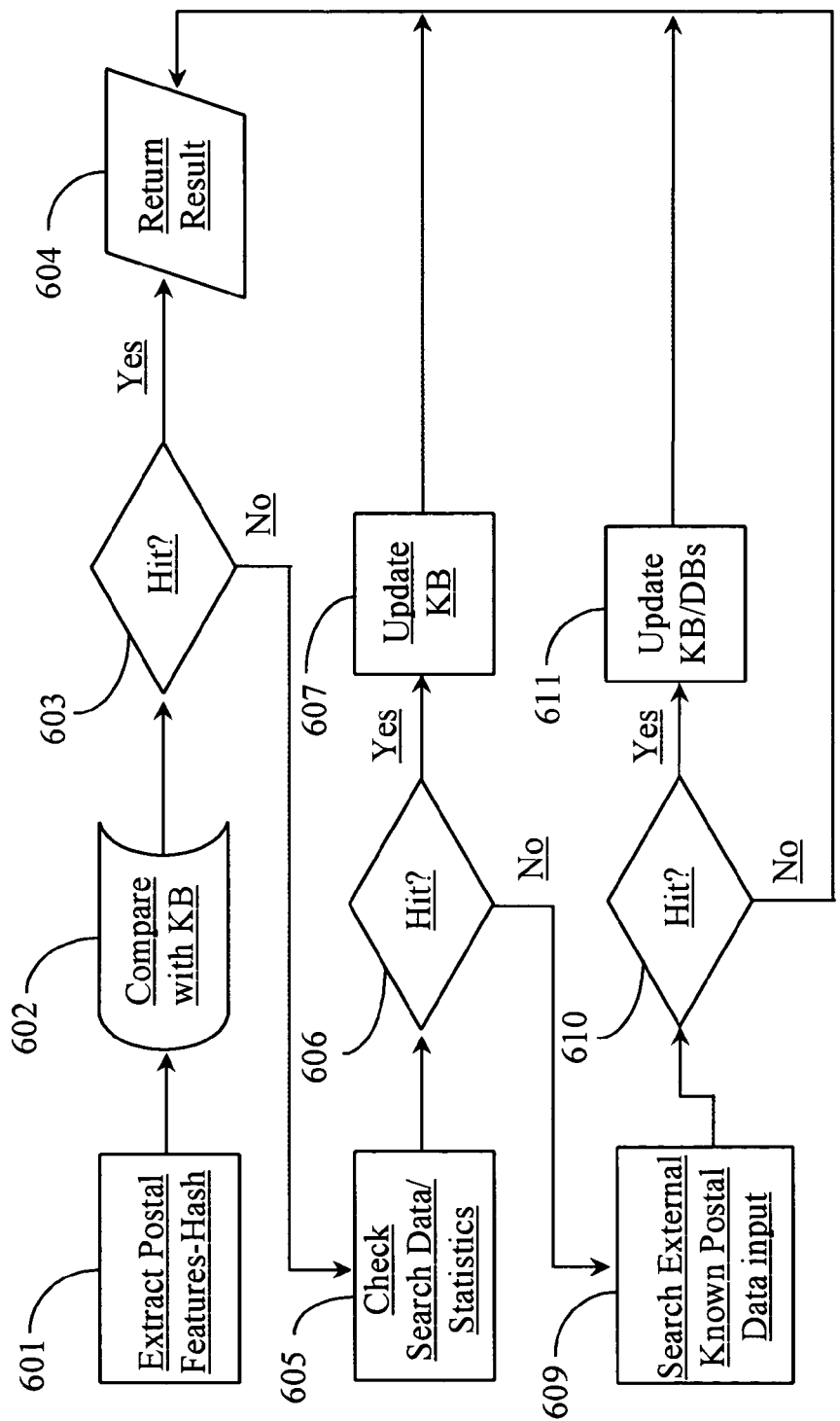
FIG. 6 is a process flow diagram illustrating steps like those of FIG. 5 using postal parameters instead of URL parameters.

FIG. 6 is a process flow diagram illustrating acts similar to those of FIG. 5 using postal parameters instead of URL parameters, in accordance with one embodiment of the invention. At act 601, a postal extractor extracts postal sub-features or features and hashes them. At act 602 the created hash values are compared against a hash table within a knowledgebase for any matching values. At act 603, if there is a hit, then raw data pointed to by the matching hash is returned to the extractor in act 604. As was previously describe above, the raw data may encompass value-based attributes that are affected by weighting rules associated with a weighting model analogous to model 210 described with reference to FIG. 2 above.

If there is no hit in act 603 for any sub-feature or feature, then optionally at step 605 the canonical portion that was hashed may be used as text input to a search database including statistical data. If a hit is obtained, then the raw data is updated to the knowledgebase and returned to the extractor as was described with reference to acts 507 and 504 described with reference to FIG. 5. If there is no hit, then optionally act 609 can be performed to search one or more pre-defined data sources held externally using the known postal data as input. If there is a hit at act 610 then the information can be intercepted by a human and analyzed for updating to the appropriate databases and the knowledgebase. If the selected data represents a new class of attribute then the weighting model may be updated with a new weighting rule to handle the weight assignment for the new attribute. If there is no hit in act 610, then a null value can be returned. Null values may also be returned at act 606 and at act 603 if no hits are registered.

It will be apparent to one with skill in the art that the processes of FIGS. 5 and 6 can be reduced to a simple form (four step process involving only the knowledgebase), or can be expanded to include further and optional sub-steps without departing from the spirit and scope of the present invention. As one embodiment of the present invention includes hashing identifiable sub-features of a whole contact feature, it will be appreciated by one with skill in the art that many parallel processes may be executed and run concurrently for each email processed.

In one embodiment where contact matrices are employed in knowledgebase 206 of FIG. 2, firing of a matrix that returns data about most if not all of the other associated contact features and sub-features that were detected in a given message body may cause any running threads continuing to search for hash values to terminate and accept the raw data provided from a matrix tree in the knowledge base. Other optimization strategies are possible.

It will be apparent to one with skill in the art that the processes described herein with reference to exemplary embodiments of the invention can be used for a telephone contact feature extractor as well as for postal and URL extractors, and that feature extractors in general can use canonical variances when searching for a representative structure and or sub-feature extraction wherein the separate sub-features may be found independently and then associated to form a canonical representation of the whole contact feature.

Figure 7:
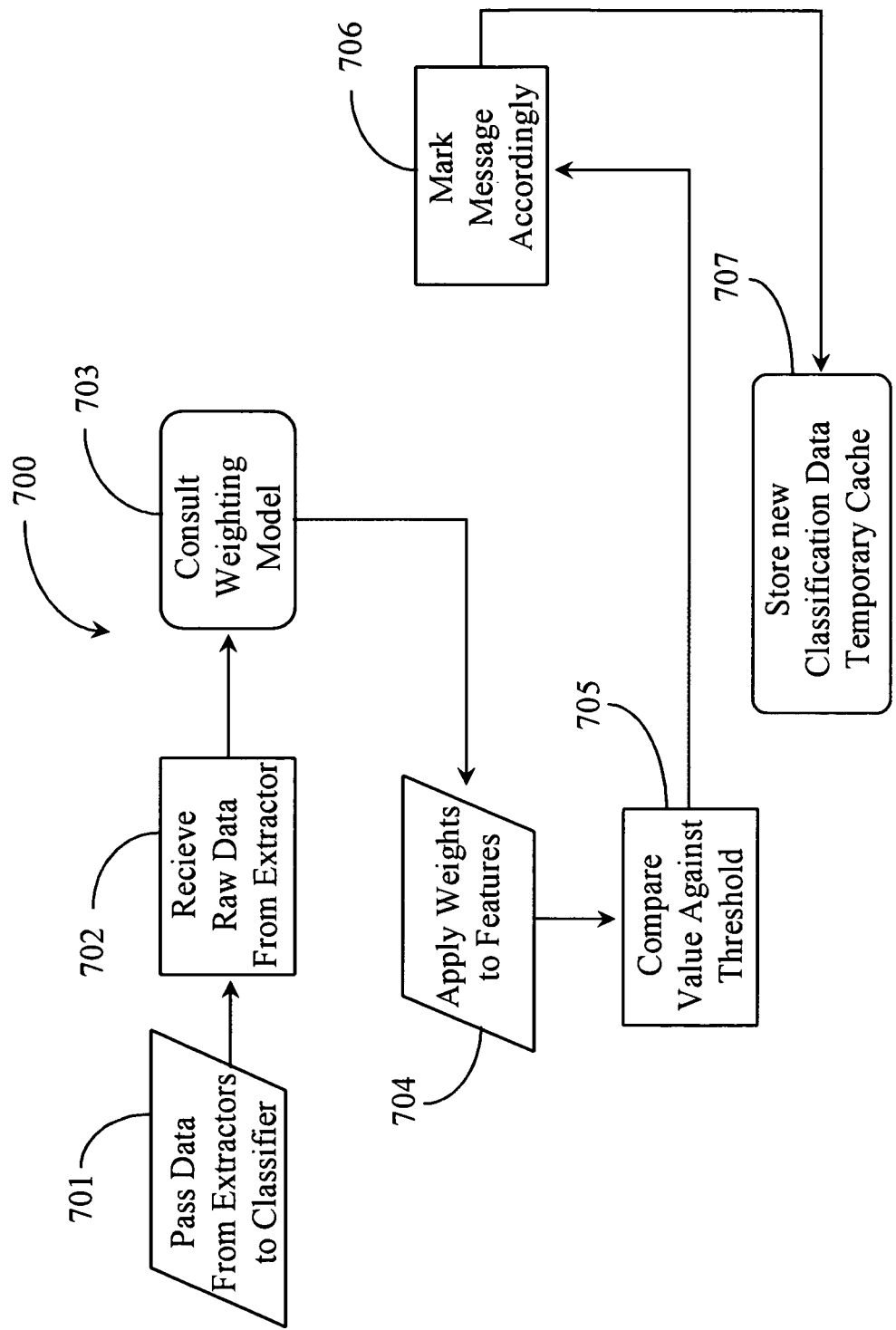
FIG. 7 is a process flow diagram illustrating steps for weighting raw results and calculating a final spam determination for an email according to an embodiment of the present invention.

FIG. 7 is a process flow diagram illustrating acts for weighting raw results and calculating a final spam determination for an email according to an embodiment of the present invention. At act 701 in this embodiment the feature extractors analogous to extractors 205 described with reference to FIG. 2 pass their raw result data to a classification component termed a classifier hereinafter. At act 702 a classifier analogous to classifier 209 also described with reference to FIG. 2 above receives the raw data sets from extractors. At act 703 the classifier consults a weighting model to retrieve weight values for each set of raw data. A weighting scheme can be as simple as tagging a set of raw data with a 0 or 1, indicating a poor or a good ranking or reputation respectively. In one embodiment wherein raw data attributes for sub-features are separately weighted, certain combinations of those features might be associated with an overriding attribute.

In some implementations of the invention, more than one portion known about a whole contact feature used in combination will typically reveal more useful information than either separate portion of the combination. An example might be that of an area code having a population attribute and a commercial/residential percentage attribute wherein the percentage might be equally mixed between commercial and residential or 50%. The first 3 digits of the telephone number might not be useful without the area code information and should return a null value. However, in combination with the correct area code, the first 3 digits of the number might cover an area that is entirely residential having 0% of the former 50% commercial designation for the broader region covered by the area code. Thus, the system may assume that the mail is spam because no legitimate businesses reside in the area used by the first 3 digits of the telephone contact information. In this case then, the attribute of 100% residential overrides and negates the 50% designation for the broader area code region. A poor ranking might be the result of the override regardless of the separate weight values applied previously.

It is noted that if a simple poor or good ranking is practiced then a 0 or 1 might be a result of the combined contact features and no threshold value exists. In this case the most complete data set that can be determined will have an overriding attribute (determined before act 701) that negates the weighting of the smaller sub-features. Act 705 in this case would not be required.

In another embodiment where a weighting system has incremental values that are proportionate to a pre-assigned weighting range, then at act 704 the classifier may apply the individual weights (scores) to the feature attributes and combine, if necessary, the feature scores and compare the final value against a threshold value in act 705. If only part of the whole feature is known, then the weighting may be calculated only for those parts known. This may be performed for every contact feature found in the email where results were available.

The final value may be a mean or average in the case of a score. At act 706 the associated message may be marked according to the final comparison. If the threshold is range-based then there are at least three possible classifications of spam, not spam, and inconclusive. If the threshold is a single value, then there may be only two possible classifications of spam or not spam. An optional act 707 is provided in the case that a classification of spam, for example, is a first of its kind in a system having the contact features found in the message body. This option provides a cache to store the contact feature data associated with the spam message so that new messages being processed can be compared with the cached results when the contact features are again detected and wherein a match automatically designates the message as spam thus enabling omission of acts 703, 704 and 705 for all messages whose contact features match the identified spam set in cache memory.

After a period of time, the cache may be purged of the temporary information. In one embodiment, the contact feature particulars of a known spam may be saved on a list indefinitely so that any new messages being processed that turn up the same contact parameters can be quickly identified without requiring processing further than detecting the contact information.

It will be apparent to one with skill in the art that the methods and apparatus of the present invention can be implemented in an integrated fashion with known filtering techniques without departing from the spirit and scope of the present invention. Likewise, the software of the present invention can be implemented as a standalone application for filtering spam mails from an email system. It will also be apparent to one with skill in the art that as more information attributes are collected and applied to contact parameters, the knowledgebase becomes more and more effective.

The methods and apparatus of the present invention may be incorporated in various email server systems regardless of the number of services and the services enabled by the present invention can be packaged in conjunction with email services hosted by a service provider or they can be extended to third party systems granted access to the knowledge system by the host.

It will be appreciated by those skilled in the art that the invention is not limited to the exemplary embodiments described, and may be implemented with some or a combination of the described features or other features, with or without modification, without departing from the spirit and scope of the invention.

What is claimed is:

1. A method for detecting spam, comprising:
   at a server system that executes spam detection software so as to classify an email message:
   accessing a message body of the email message;
   extracting a plurality of features of a return path existing in the message body, the return path for use by a recipient of the email to respond to a message in the email;
   generating a reconstructed return path from the plurality of extracted features of the return path existing in the message body of the email message, wherein the return path is a postal address, and the extracted features are postal address sub-features comprising a plurality of address components selected from the group consisting of: complete or partial street name, city name, state name, country name, street number address, postal code, designations for post office box, and post office box number; and
   classifying the email in accordance with at least the reconstructed return path;
   wherein extracting a plurality of return path features includes extracting a first postal address sub-feature that is separated from a second postal address sub-feature by one or more non-postal address terms in the message body.

2. The method of claim 1 further comprising testing the reconstructed return path against existing information to determine a probability that the email is spam.

3. The method of claim 2 further comprising using dynamic Internet searching in the testing.

4. The method of claim 2 further comprising using information from a data repository dynamically updated by Web-searching to make the determination of probability.

5. The method of claim 2, further comprising applying weighting factors to the return path to create a trust characteristic for the return path.

6. A non-transitory machine-readable medium having stored thereon a set of instructions that are executed by a server system so as to perform a method comprising:
   accessing a body portion of an email message;
   extracting a plurality of features of a return path from the body portion of the email message;
   generating a reconstructed return path from the plurality of extracted features of the return path existing in the body portion of the email message, wherein the return path is a postal address, and the extracted features are postal address sub-features comprising a plurality of address components selected from the group consisting of: complete or partial street name, city name, state name, country name, street number address, postal code, designations for post office box, and post office box number; and
   classifying the email in accordance with at least the reconstructed return path;
   wherein extracting a plurality of return path features includes extracting a first postal address sub-feature that is separated from a second postal address sub-feature by one or more non-postal address terms in the message body.

7. The medium of claim 6 further comprising instructions for testing the reconstructed return path against existing information to determine a probability that the email is spam.

8. The medium of claim 7 further comprising instructions for using dynamic Internet searching in the testing.

9. The medium of claim 7 further comprising instructions for using information from a data repository dynamically updated by Web searching to make the determination of probability.

10. The medium of claim 7, further comprising instructions for applying weighting factors to the return path to create a trust characteristic for the return path.

11. A method for detecting spam, comprising:
    at a server system that executes spam detection software so as to classify email message:
    accessing a message body of an email;
    extracting a plurality of return path features from the message body, wherein at least one of the extracted return path features is a postal address feature comprising a plurality of address sub-features selected from the group consisting of: complete or partial street name, city name, state name, country name, street number address, postal code, designations for post office box, and post office box number;
    combining values for the extracted return path features, including the postal address sub-features, in accordance with a weighting scheme for the extracted return path features, including the postal address sub-features, to produce a result; and
    classifying the email based on the result;
    wherein extracting a plurality of return path features includes extracting a first postal address sub-feature that is separated from a second postal address sub-feature by one or more non-postal address terms in the message body.

12. The method of claim 11 further comprising testing the extracted return path features against existing information to determine a probability that the email is spam.

13. The method of claim 12 further comprising using dynamic Internet searching in the testing.

14. The method of claim 12 further comprising using information from a data repository dynamically updated by Web searching to make the determination of probability.

15. A non-transitory machine-readable medium having stored thereon a set of instructions that are executed by a server system so as to perform a method comprising:
    accessing a message body of an email;
    extracting a plurality of return path features from the message body, wherein at least one of the extracted return path features is a postal address feature comprising a plurality of address sub-features selected from the group consisting of: complete or partial street name, city name, state name, country name, street number address, postal code, designations for post office box, and post office box number;

combining values for the extracted return path features, including the postal address sub-features, in accordance with a weighting scheme for the extracted return path features, including the postal address sub-features, to produce a result; and classifying the email based on the result;

wherein extracting a plurality of return path features includes extracting a first postal address sub-feature that is separated from a second postal address sub-feature by one or more non-postal address terms in the message body.

16. The machine-readable medium of claim 15 further comprising instructions for testing the extracted return path features against existing information to determine a probability that the email is spam.

17. The machine-readable medium of claim 16 further comprising instructions for using dynamic Internet searching in the testing.

18. The machine-readable medium of claim 16 further comprising instructions for using information from a data repository dynamically updated by Web searching to make the determination of probability.

* * * * *